Dec. 22, 1964 A. A. BURRELL 3,162,057
SPROCKET WHEEL
Filed Oct. 17, 1962

INVENTOR
ALFRED A. BURRELL
ATTORNEY

United States Patent Office 3,162,057
Patented Dec. 22, 1964

3,162,057
SPROCKET WHEEL
Alfred A. Burrell, 10323 106th St., Edmonton, Alberta, Canada
Filed Oct. 17, 1962, Ser. No. 231,164
3 Claims. (Cl. 74—243)

This invention relates to improvements in a sprocket wheel and appertains particularly to one having a separable hub.

An object of the invention is to provide a sprocket wheel consisting of a sprocket plate and a hub that are easily assembled and separated, rendering the same readily interchangeable. The extreme versatility of this two-part sprocket enables a dealer to supply a very wide variety of needs whilst carrying only a relatively small stock of hubs and sprocket plates or other wheel parts.

A further object of the invention is to provide a separable, two-part sprocket, wherein the hub fits in a central opening in the sprocket plate with coacting teeth on hub and plate to prevent relative rotative movement, having means to assure the true radial positioning of the sprocket on the hub in a plane at right angles to the axis thereof.

A further object of the invention is to provide a separable, two-part sprocket having independent means for securing the sprocket plate or other wheel part on the hub against relative rotative and accidental longitudinal movements.

A further object of the invention is to provide a separable, two-part sprocket in which the sprocket plate and hub are axially slidable into relative non-rotative engagement and secured against accidental axially slidable separation by the fastening means that coact with the hub to assure the true radial positioning of the sprocket plate in a plane at right angles to the hub's axis.

A still further object of the invention is to provide a sprocket wheel of the nature and for the purpose described in which the parts are characterized by structural simplicity, as for instance using sprocket plates of uniform thicknesses, rendering the same capable of manufacture at reasonable cost.

To the accomplishment of these and related objects as shall become apparent as the description proceeds, the invention resides in the construction, combination and arrangement of parts as shall be hereinafter more fully described, illustrated in the accompanying drawings, and pointed out in the claims hereunto appended.

The invention will be best understood and can be more clearly described when reference is had to the drawings forming a part of this disclosure wherein like characters indicate like parts throughout the several views.

Figure 5:
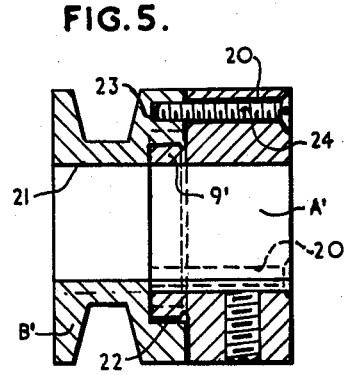
FIGURE 5 is a vertical longitudinal section, similar to FIGURE 1, showing a modified two-part wheel structure.

The many advantages of the separable, two-part sprocket consisting of interchangeable cylindrical hubs and wheel parts such as flat sprocket plates will be obvious as regards reduced production costs, the greatly reduced range of parts a dealer must stock and the ease with which a user can replace and/or vary the gear relation on a machine by simply substituting new sprocket wheel plates which in some cases can be done without even removing the hub. The corollary however of the separable structure has been (1) its weakness when oversimplification of the assembly has been sought with a wheel plate that was either too difficult to remove or one that was unreliable and inclined to creep axially or deviate from true radial position on the one hand and (2) its clumsy, bulky and expensive form when attempts have been made heretofore to build in the required strength and prevent the accidental rotative movement, axial creeping or departure from true radial position of the sprocket wheel plate, on the other hand.

I believe that my present sprocket wheel successfully overcomes these deficiencies and provides a much needed, low priced and thoroughly reliable interchangeable two-part structure that I call an "adapta-hub" sprocket.

Basically the two parts of my sprocket are a hub member A and a sprocket wheel plate B. The hub is of generally cylindrical form of suitable size with its opposite ends flat and parallel and having the usual axial bore 5, with a longitudinally extending radial keyway slot 6 and threaded radial bore 7 for a set screw 8 when such are desired.

One end 9 of the hub A is of reduced exterior diameter forming an abrupt, flat radial shoulder 10 of substantial area and lying in a plane at right angles to the hub's axis. About its entire periphery this reduced diameter end 9 of the hub A is provided with coarse pitch teeth 11 extending the length thereof, substantially paralleling the axis. At its inner end this toothed reduced portion is provided with a suitable under-cut or chip clearance recess 4. Approximately midway of the height of the shoulder 10, circumferentially spaced, interiorly threaded apertures 12 are provided that parallel the axis of the hub.

Figure 1:
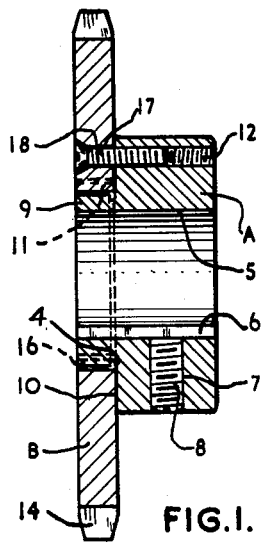
FIGURE 1 is a vertical longitudinal section through an assembled sprocket wheel constructed in accordance with my invention.
Figure 2:
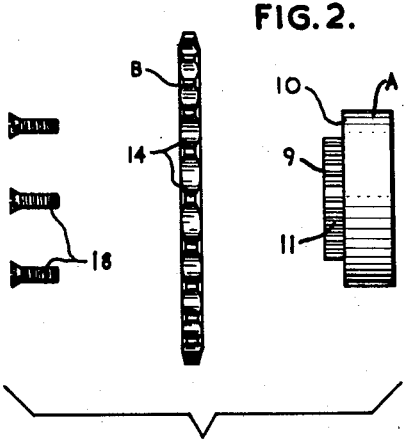
FIGURE 2 is an exploded side elevation of the components of the sprocket wheel shown in FIGURE 1, on a reduced scale.
Figure 3:
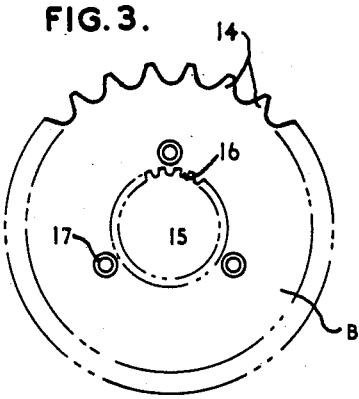
FIGURES 3 and 4 are end elevations of the sprocket plate and hub respectively.
Figure 4:
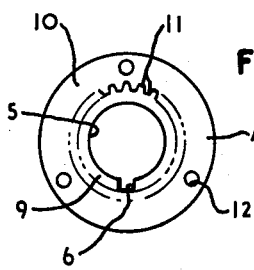

The sprocket wheel plate B shown in FIGURES 1, 2 and 3 is circular, being flat and of uniform thickness throughout. Teeth 14 are provided about its periphery and the plate has a concentric central bore 15 of a size to fit on the reduced diameter end 9 of the hub A and interiorly provided with teeth 16 substantially parralleling the axis and that correspond and engage with the complete circle of teeth 11 on the hub and preclude any possible relative rotative movement between the sprocket wheel plate and its hub. It is to be noted that the thickness of the sprocket wheel plate B is shown as the same as the length of the reduced diameter end 9 of the hub so that when pressed thereon, with the inner side of the plate in tight contact with the shoulder 10, the outer face of the plate B and the end of the hub A lie in the same plane. As sprocket wheel plates of various diameters may be interchangeably applied to the hub and as it may be found desirable to strike these plates from stock of different thicknesses, there are times when the outer face of the plate could lie either inside or project beyond the end of the hub. In such cases, if desired to provide the assembled wheel with a flush end, a ring spacer could be employed or the projecting end of the hub ground off. The sprocket wheel plate B has circumferentially spaced bores 17 equal in number and corresponding in spacing to register with the threaded bores 12 extending through the shoulder 10 and into the main body of the hub A. These bores 17 are countersunk on their outer ends and when the sprocket wheel plate B properly applied on the reduced diameter end of the hub A, with the bores 17 and threaded bores 12 in alignment, suitably countersink headed fastening bolts, such as the machine screws 18, are inserted through the bores 17 and threaded in the bores 12 in the hub to draw and secure the plates onto the hub in tight engagement with the shoulder 10; not only positively holding the sprocket wheel plate against accidental longitudinal or axial movement on the hub but assuring the true radial positioning thereof at right angles to the axis of the hub.

Thus there is provided an easily manufactured and assembled and a cheaply constructed two-part "adapta hub" sprocket wheel utilizing a relatively thin sprocket wheel plate that is positively connected to the hub against relative rotative movement and undesirable longitudinal or axial movement and is positioned thereon in true radial position at right angles to the axis of the hub and yet in most cases capable if desired of presenting an end face with the plate, hub-end and screw heads all lying in a common plane.

Throughout this specification, the item has been described as a sprocket wheel, implying that it is intended for a chain drive, however, it will be apparent that the instant two-part wheel structure has other applications such as meshing spur gears, sheaves and the like and is not limited to chain sprocket wheels so that the term sprocket wheel is to be read in this light.

Though it might appear from the preceding description that a two-part wheel structure in which the wheel member B fits on over the reduced diameter end of the hub A must have a wheel diameter greater than that of the hub, it is quite feasible to mount a wheel part on the hub and secure it tightly to the hub shoulder, in the manner already set forth, in which the wheel part whether sprocket, gear, sheave or the like, has an operative diameter scarcely greater than the axle bore in the hub.

In FIGURE 5, the hub A' is identical to the already described hub A in all respects save only that the apertures 20 are not interiorly threaded and are countersunk at the large end of the hub. The wheel part B' is shown as a V-belt sheave, though it could obviously be finished as either a sprocket or gear pinion, extending from the hub longitudinally of the axis and having an axial bore 21 that registers with the bore of the hub. To accommodate the externally toothed, reduced diameter end 9' of the hub, the wheel part B' has a circumferentially toothed coaxial pocket 22 to accommodate the hub end 9, and threaded bores 23 for registry with the apertures 20 to receive machine screws 24 inserted through the hub. With this longitudinally offset wheel part construction, a sheave, pinion or sprocket with smaller diameter than the hub can be provided.

Figure 6:
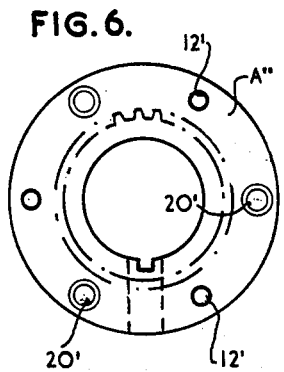
FIGURE 6 is an end elevation of a slightly modified hub that is useable with the two-part wheel structures shown in both FIGURES 1 and 5.

Because I may desire to use the hub as in either FIGURE 1 or 5, it is preferably formed as the hub A" shown in FIGURE 6 having two sets of apertures, namely a plurality of interiorly threaded apertures 12' and an alternately spaced set of apertures 20' of slightly larger bore and without interior threading thereby allowing the interchangeable wheel parts to be secured on the hub end and held in tight engagement with the shoulder by machine screws applied in either way.

From the foregoing description taken in connection with the accompanying drawings, it will be manifest that a separable two-part sprocket wheel is provided that will fulfill all the necessary requirements of such a device, but as many changes could be made in the above description and many apparently widely different embodiments of the invention may be constructed within the scope of the appended claims, without departing from the spirit or scope thereof, it is intended that all matters contained in the said accompanying specification and drawings shall be interpreted as illustrative and not in a limitative or restrictive sense.

What is claimed as new is:

1. A sprocket wheel comprising a hub and a separable sprocket wheel plate, wherein the said hub is of generally cylindrical form with opposite ends flat and parallel and has an axial bore with a keyway slot, one end of said hub being of reduced diameter and forming an abrupt, flat radial shoulder of substantial area between the reduced diameter end portion and the main body of the hub, said shoulder lying in a plane at right angles to the axis of the hub, said reduced diameter end portion of the hub having about its entire periphery radial teeth that extend the length thereof substantially parallel with the axis of the hub the inner end of the reduced diameter toothed portion of the hub having an undercut chip clearance recess, and said sprocket wheel plate being flat, of uniform thickness throughout and having a toothed central bore corresponding with and fitting on the toothed reduced diameter end portion of said hub in relative non-rotatable relation and lying in tight engagement against said shoulder in true radial positioning in a plane at right angles to the axis of the hub.

2. The combination with the structure of claim 1, of means securing said plate to said hub with the inner side of the plate in intimate engagement with and held in tight contact against said shoulder, assuring the true radial position of the said plate.

3. The sprocket wheel according to claim 2 wherein the sprocket wheel plate is of the same thickness as the length of the reduced diameter end portion of the hub and said means comprises machine screws passing through said plate and threaded into said hub approximately midway of said shoulder and having their heads countersunk in said plate, whereby the outer face of the plate, the end of the hub and the heads of the screws all lie in a common plane.

References Cited by the Examiner
UNITED STATES PATENTS

| | | | |
|---|---|---|---|
| 2,235,457 | 3/41 | Lorimor | 301—1 |
| 2,471,906 | 5/49 | Smith | 74—230.3 |
| 2,932,207 | 4/60 | Whitney | 74—243 |

DON A. WAITE, *Primary Examiner.*

MILTON KAUFMAN, *Examiner.*